Figure 10:
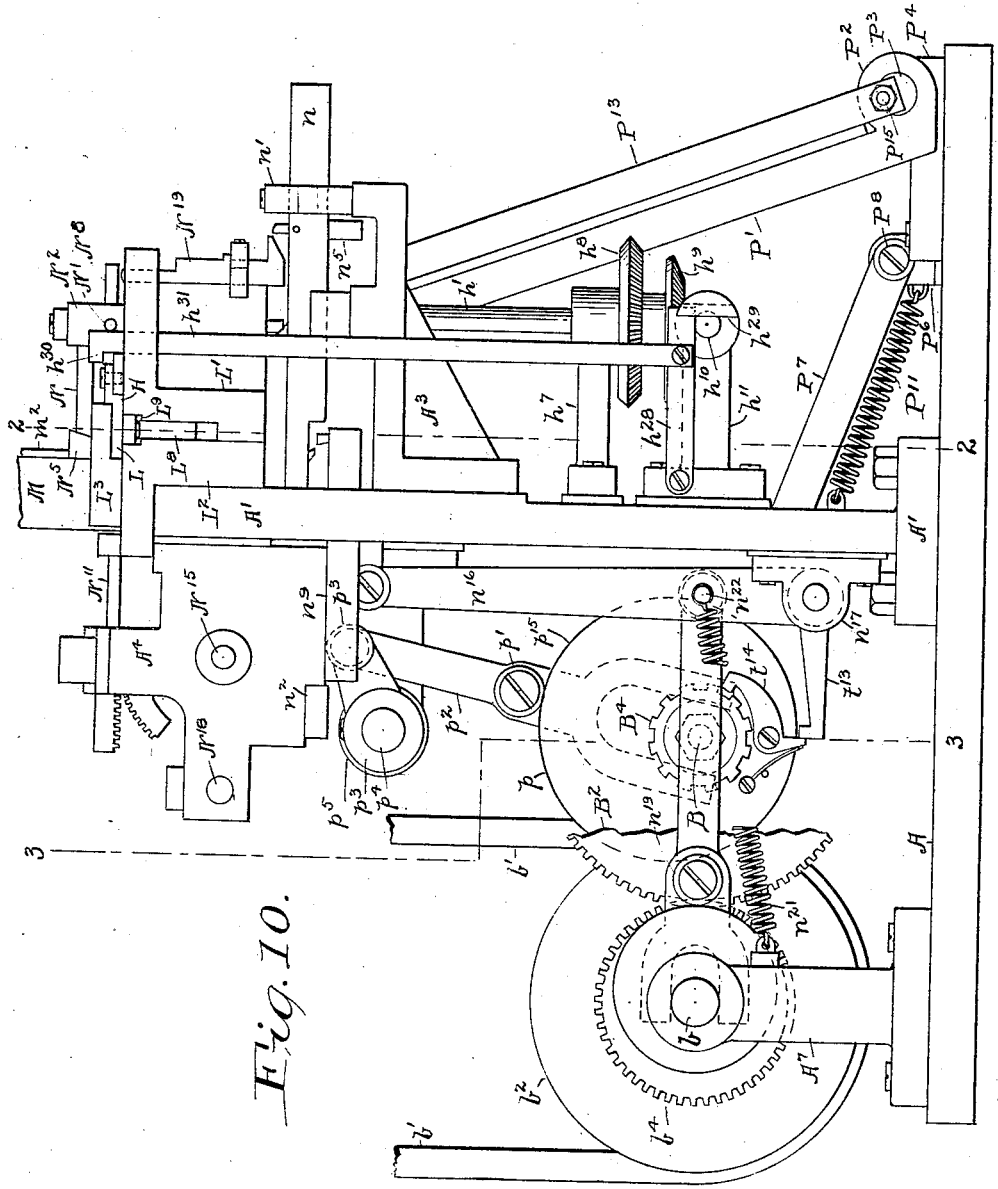

F. B. CONVERSE, Jr.
JUSTIFYING MECHANISM.
APPLICATION FILED NOV. 9, 1903.
903,677.
Patented Nov. 10, 1908.
11 SHEETS—SHEET 1.
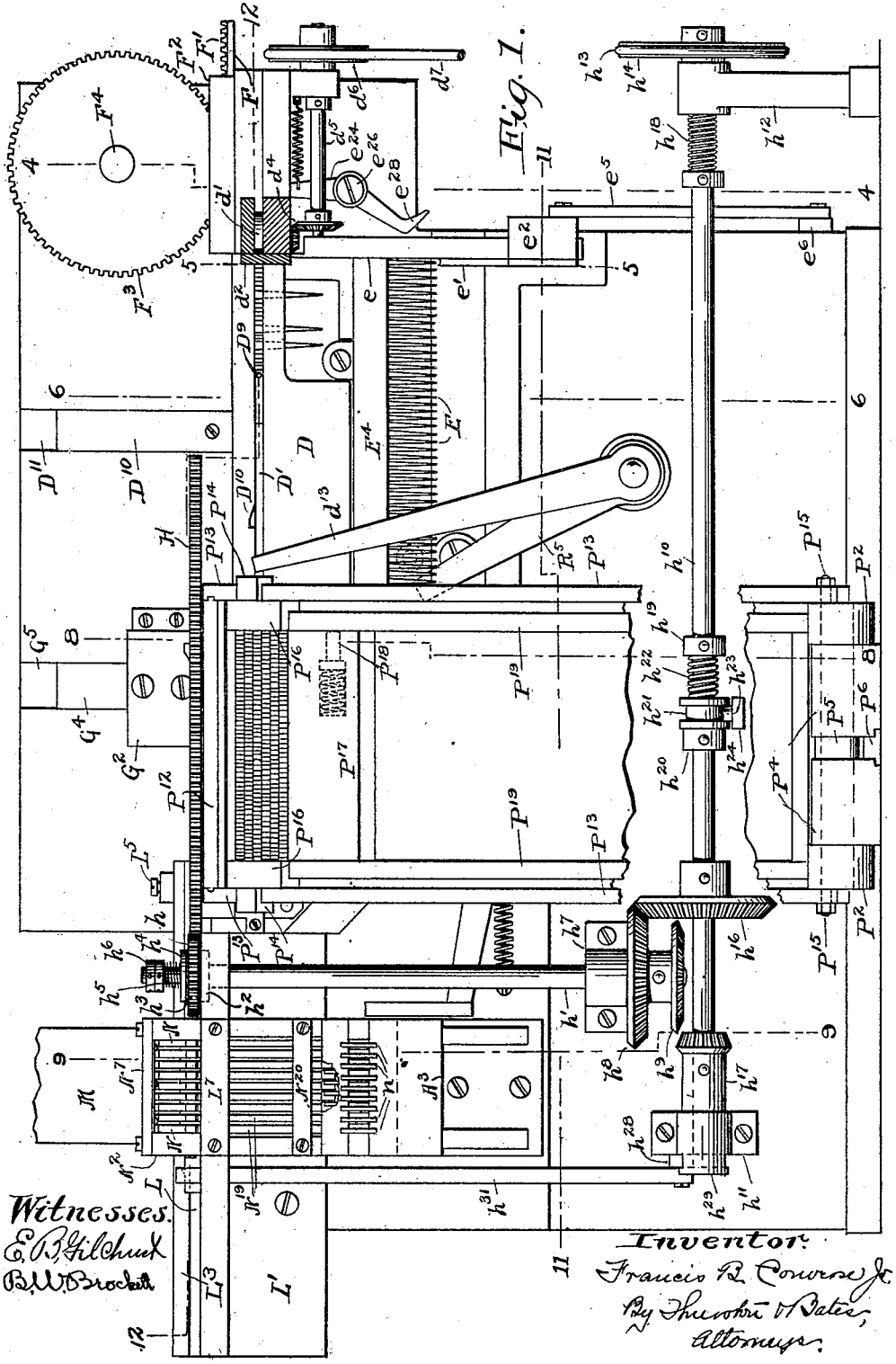
Fig. I.
Witnesses:
E. B. Gilchrist
B. W. Brockett
Inventor:
Francis B. Converse Jr.
By Theodore Bates,
Attorney.

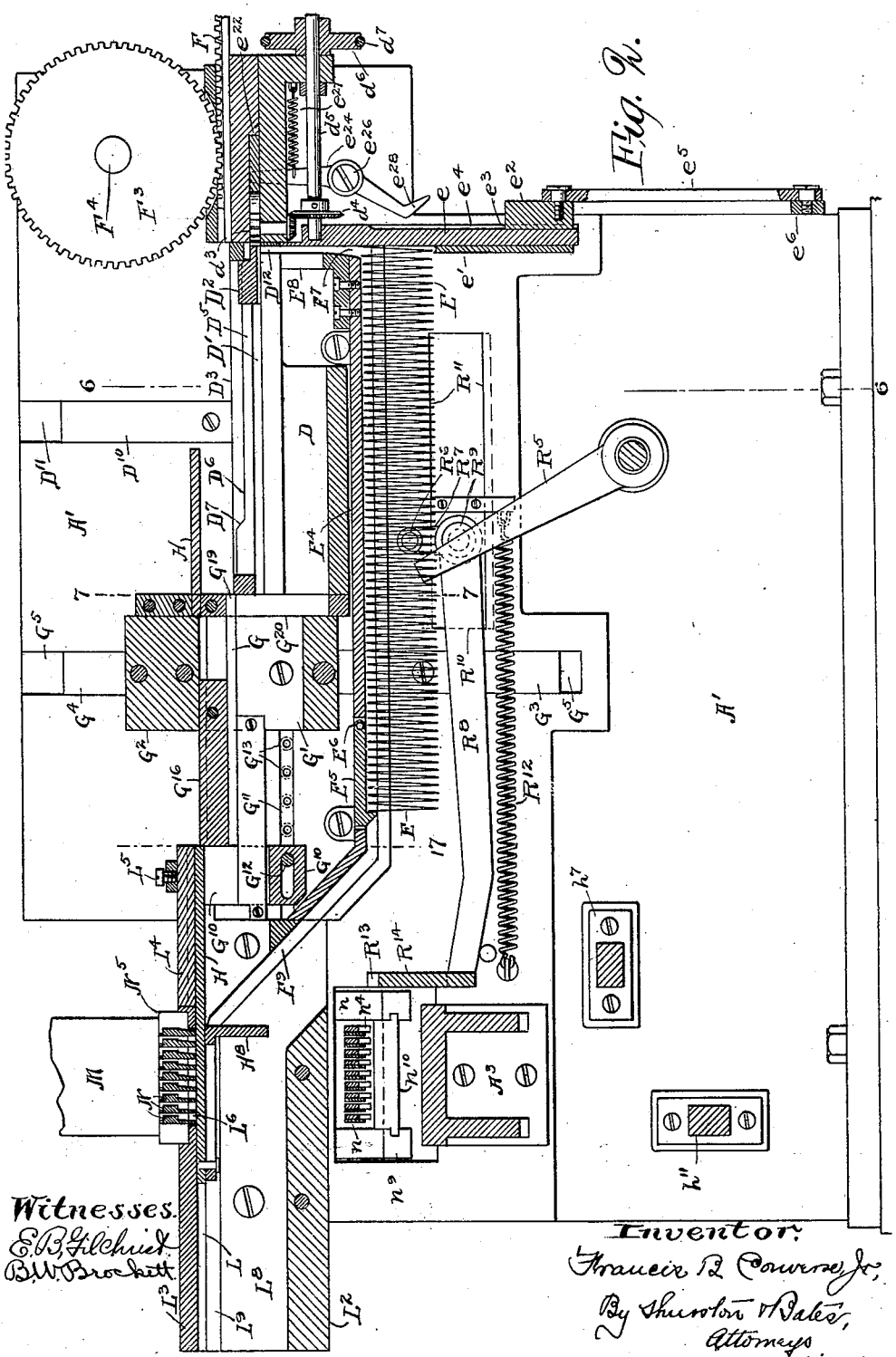

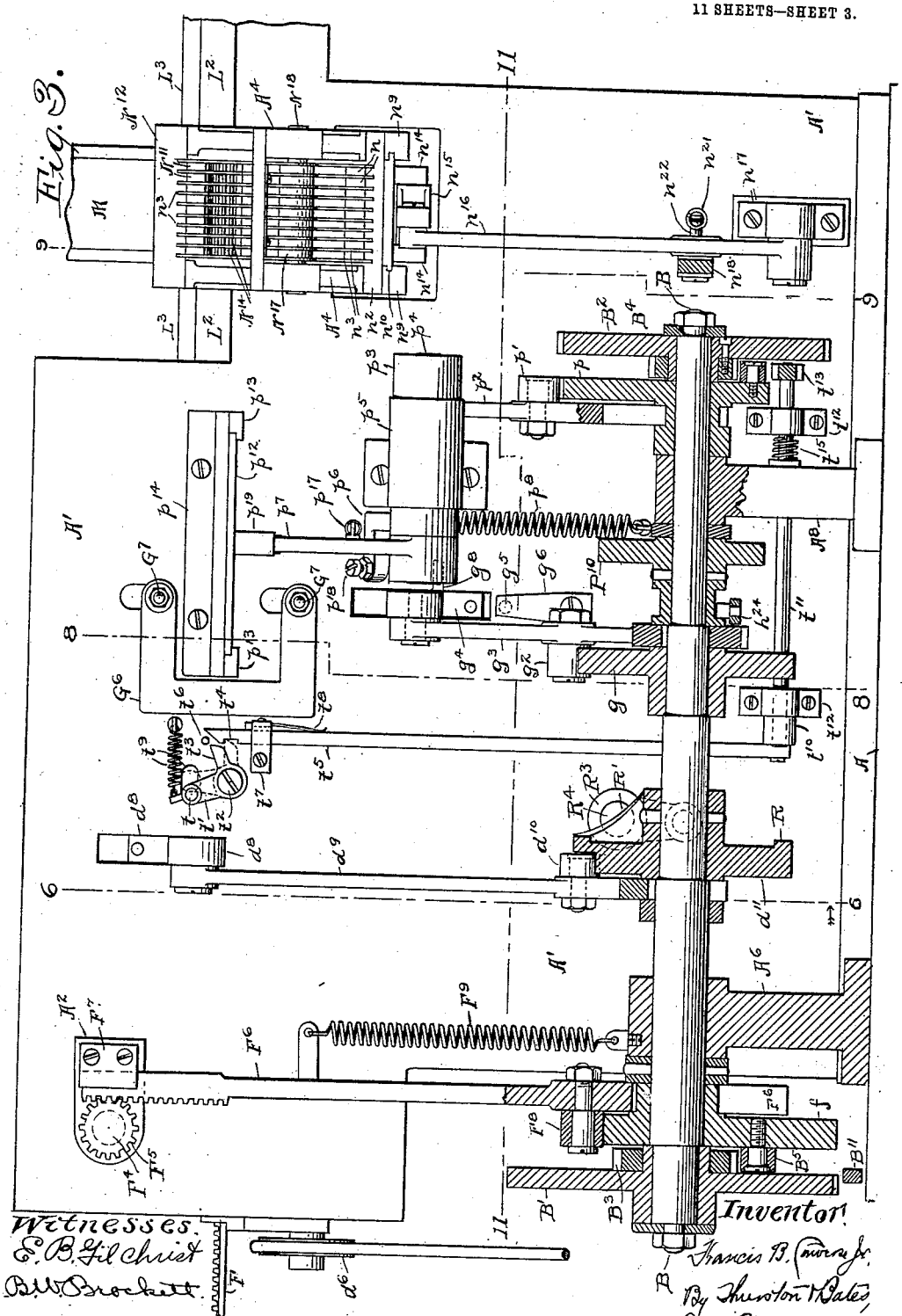

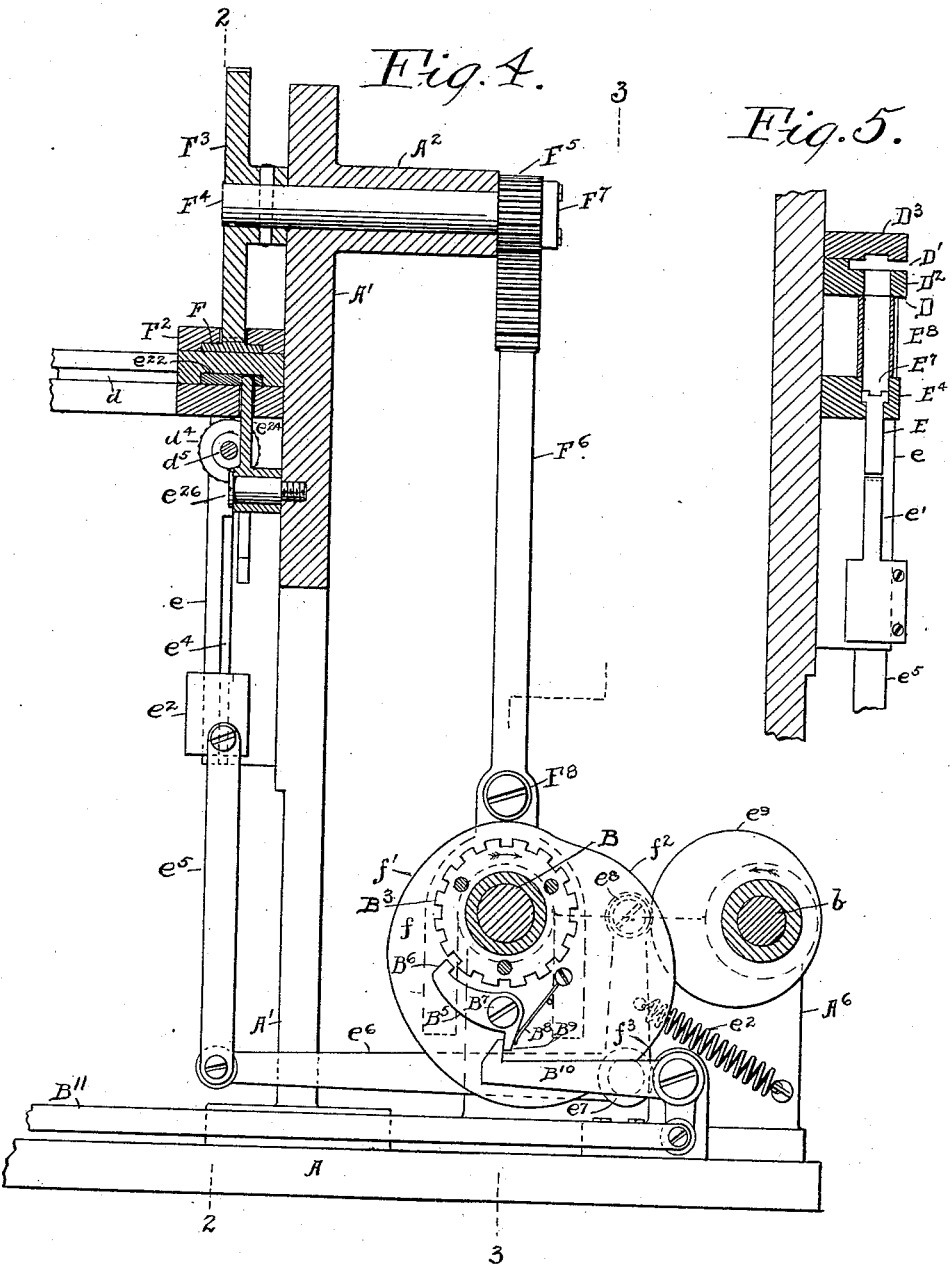

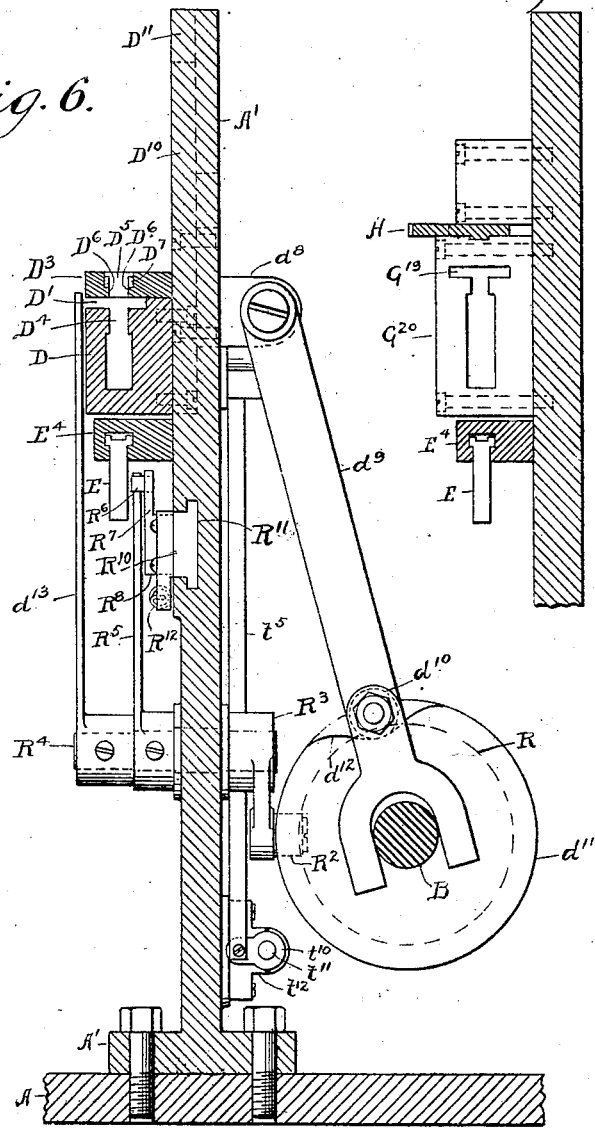

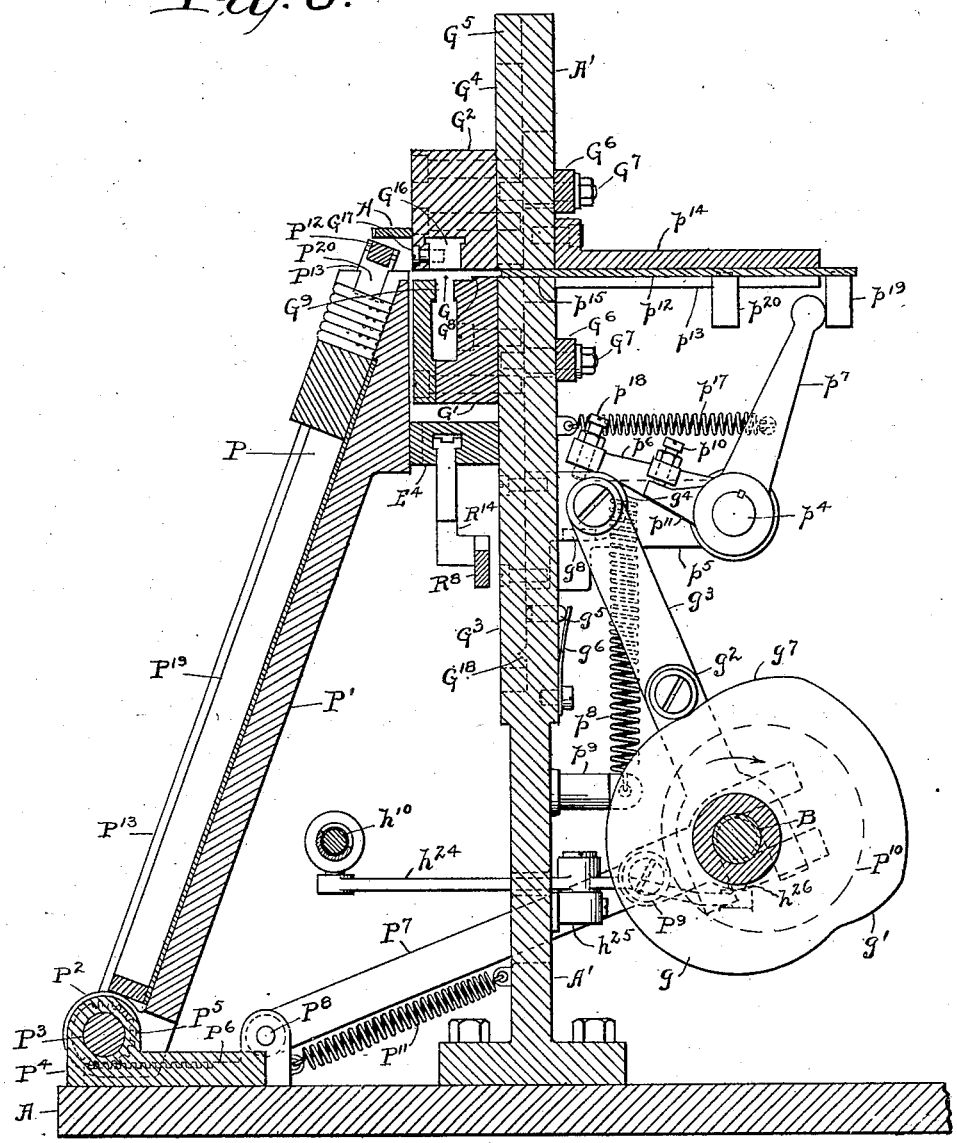

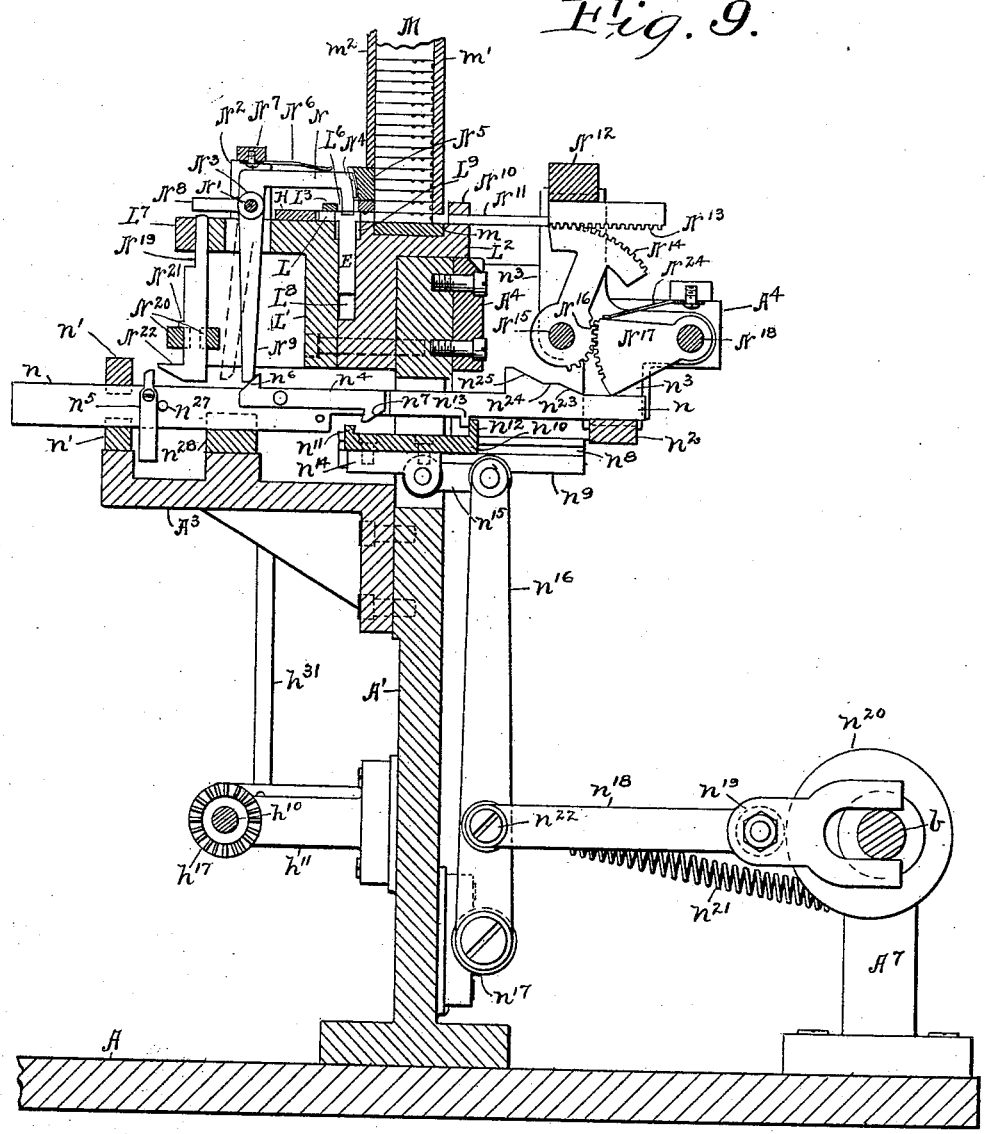

F. B. CONVERSE, Jr.
JUSTIFYING MECHANISM.
APPLICATION FILED NOV. 9, 1903.

903,677.

Patented Nov. 10, 1908.
11 SHEETS—SHEET 9.

Witnesses.
E. B. Gilchrist
B.W. Brockett.

Inventor:
Francis B. Converse Jr.
By Thurston & Bates
Attorneys

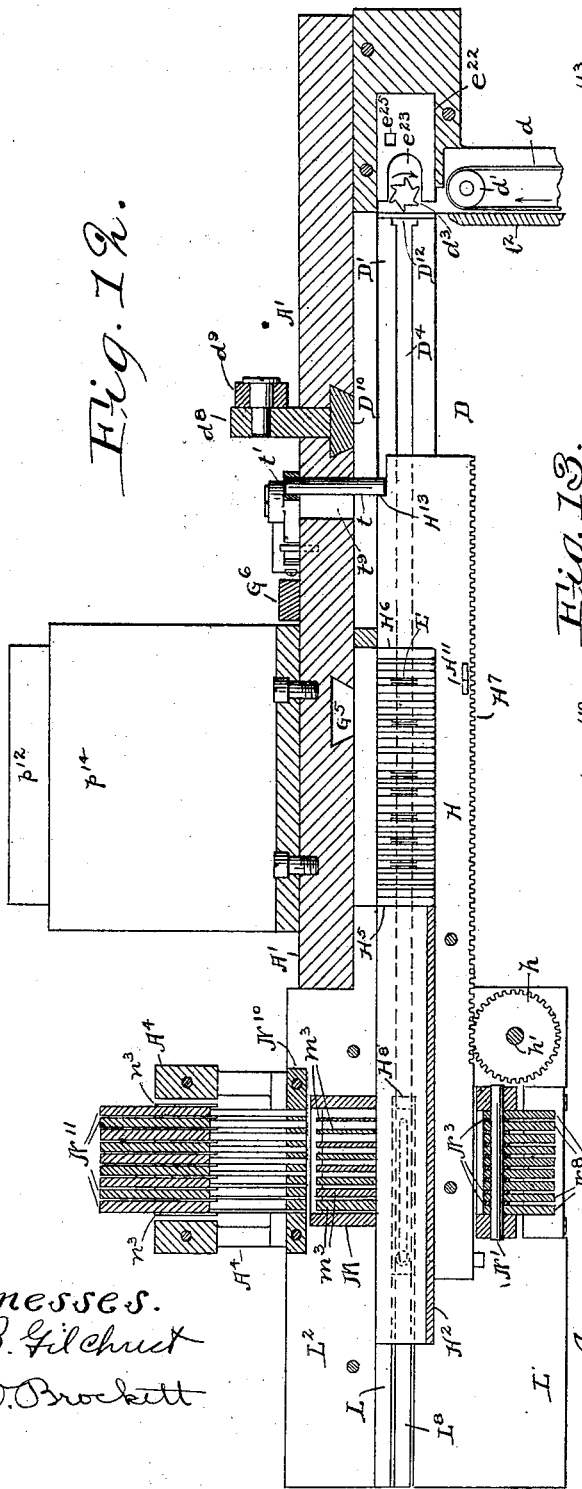

F. B. CONVERSE, Jr.
JUSTIFYING MECHANISM.
APPLICATION FILED NOV. 9, 1903.

903,677.

Patented Nov. 10, 1908.
11 SHEETS—SHEET 11.

Witnesses.
E. B. Gilchrist
B. W. Brockett

Inventor.
Francis B. Converse Jr.
By Thurston & Bates,
Attorneys.

UNITED STATES PATENT OFFICE.

FRANCIS B. CONVERSE, JR., OF CLEVELAND, OHIO, ASSIGNOR, BY MESNE ASSIGNMENTS, TO MERGENTHALER LINOTYPE COMPANY, A CORPORATION OF NEW YORK.

JUSTIFYING MECHANISM.

No. 903,677.  Specification of Letters Patent.  Patented Nov. 10, 1908.

Application filed November 9, 1903. Serial No. 180,345.

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Justifying Mechanism, of which the following is a full, clear, and exact description, reference being had to the accompanying drawings.

The object of this invention is to provide a simple, efficient and rapid mechanism for justifying lines of type or matrices.

The machine, as shown in the drawings, is adapted particularly for the justification of type. Practically the same mechanism may be used for the justification of matrices from which a line is to be cast.

The operation of the machine is in general terms as follows: The line of type is assembled with compressible spring spacers between successive words. These spacers normally occupy space in the line greater than the width of the largest of the permanent spaces provided in the machine. The line, with these spacers in it, is set longer than the required length the line is to be when justified and is thereafter compressed to the required length, the spring spacers yielding to permit this compression. It is then transferred to a carrier which passes the line successively under feelers, each of less width than the preceding feeler, until one is reached of equal or slightly less thickness than the gaps maintained between the words by the spacers, whereupon the feeler snaps into the gap thereby stopping the advancement of the line and setting into operation mechanism which ejects the spring spacer from the line and inserts in lieu thereof a permanent space of substantially the same, or slightly greater, thickness than the feeler engaged. This operation is repeated for each space in the line, which, having been thus justified, is moved by the carrier to a position in registration with a galley in which the line is finally deposited.

Figure 11:
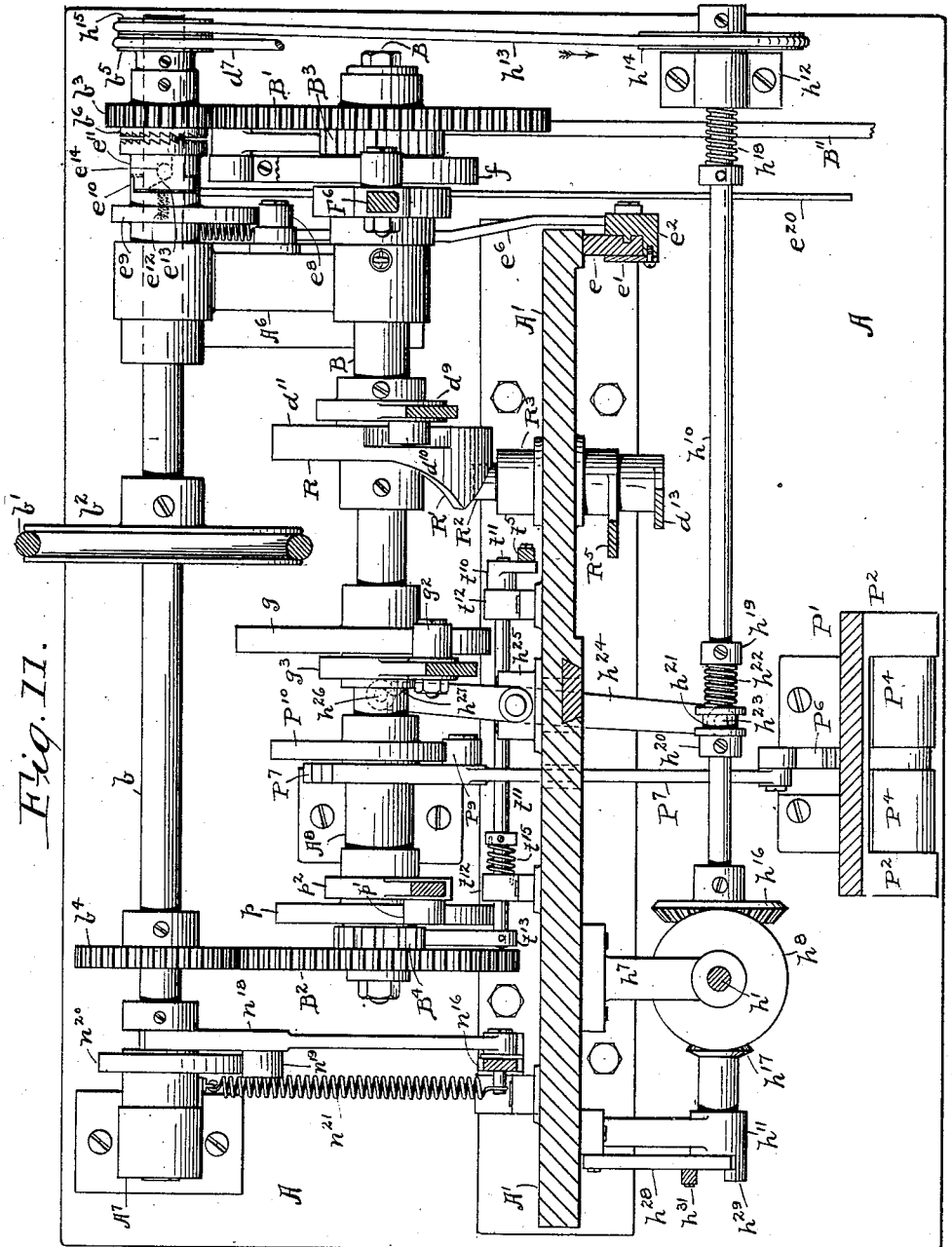
Figure 17:
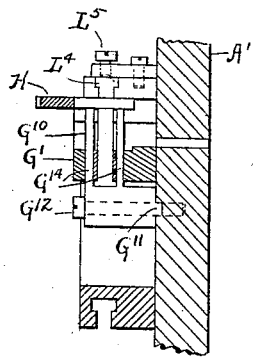
Figure 16:
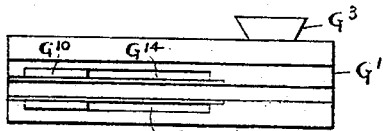
Figures 18, 19:
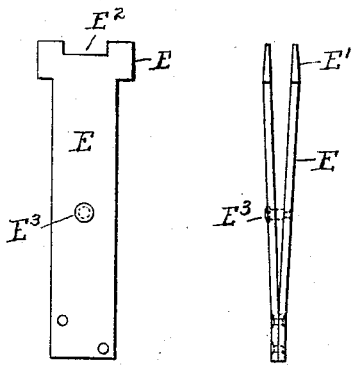
Figure 20:
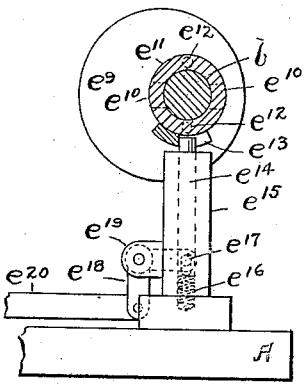

Figure 1 is a front elevation of the justifying mechanism; Fig. 2 is a front sectional elevation behind Fig. 1, being upon line 2—2 of Figs. 4 and 10, to be hereafter referred to. Fig. 3 is a sectional elevation taken from the rear on line 3—3 of Figs. 4 and 10. Fig. 4 is a vertical cross section taken from the right on line 4—4 of Fig. 1. Fig. 5 is a vertical cross section on line 5—5 of Fig. 1 taken from the left. Fig. 6 is a vertical cross section on line 6—6 of Figs. 1 and 3 taken from the right. Fig. 7 is a partial vertical cross section on line 7—7 of Fig. 2, taken from the right. Fig. 8 is a vertical cross section on line 8—8 of Figs. 1 and 3, taken from the right. Fig. 9 is a vertical cross section approximately on the line 9—9 of Figs. 1 and 3, taken from the right. Fig. 10 is a left hand end elevation of the machine. Fig. 11 is a horizontal section on line 12—12 of Figs. 1 and 3. Fig. 12 is a sectional plan approximately on line 12—12 of Fig. 1, being through the upper edge of the path of travel of the line of type through the justifying mechanism. Fig. 13 is a plan of the type carrier: Fig. 14 is a front elevation of the same: Fig. 15 is a left hand end elevation of the same: Fig. 16 is a detailed plan view of the lower member of the type elevator. Fig. 17 is a vertical section on line 17—17 of Fig. 2, taken from the right. Fig. 18 is a detail view on an enlarged scale of one of the temporary spring spacers used in this machine. Fig. 19 is a side elevation of the same. Fig. 20 is a vertical cross section, showing means for operating the spring spacer inserting clutch.

The same reference letters are used throughout the drawings to indicate the same parts wherever shown, the reference letters being classified as follows, capitals and small letters with their powers of each denomination being used: A frame, B power and cam shafts, D assemblage member and operating mechanism, E temporary spacers and inserting mechanism, F line compressing mechanism, G line elevator, and operating mechanism, H line carrier and advancing mechanism, L justifying channel, M permanent space case, N permanent space inserting mechanism, P galley and its mechanism, R mechanism for returning temporary spaces, T clutch trip for galley delivery.

*Frame and power shafts.*—The operations of the justifying mechanism are entirely automatic from the time of the reception of a line from the setting mechanism to the delivery of the line upon the galley, being controlled by various cams upon two power actuated shafts. A bed plate A is provided, upon which is secured the vertical main frame $A^1$, and various standards which together support the necessary mechanisms.

The shaft $b$, having bearings in the pillow blocks $A^6$ and $A^7$, is continuously rotated from any convenient source of power, as a belt $b^1$ passing over the pulley $b^2$. This shaft carries a pinion $b^3$ in mesh with a spur gear $B^1$ rotating freely on the shaft B, and another pinion $b^4$ in mesh with the spur gear $B^2$ also rotating freely on the shaft. This shaft B is journaled in the pillow blocks $A^6$ and $A^8$, and is normally at rest. Each of the gears $B^1$ and $B^2$ have secured to them a clutch member $B^3$ and $B^4$, capable of being operated at the proper time, the former to communicate one complete rotation to the shaft B, and the latter to the cam $p$ which is loosely journaled on the shaft B. These clutch mechanisms and their operation will be more fully described hereinafter.

*Type assembling mechanism.*—Any convenient form of mechanism for assembling type successively in line in a horizontal position may be used, such mechanism being represented in the drawings diagrammatically by a continuously operating belt $d$ (Figs. 1 and 12) passing over a roller $d^1$ and adapted to carry between it and the plate $d^2$ the type delivered to the belt by the manipulation of the keys of any of the forms of setting mechanism, such as are familiar in the art. This belt advances the type to within the range of a packer wheel $d^3$ which is rotated continuously in the direction of the arrow in Fig. 12. The type are received between this packer wheel and the follower $D^2$ (Fig. 2) in the assemblage channel $D^1$ or, in the case of succeeding type, between the packer and the previously assembled type, the packer wheel advancing the type toward the left out of the path of succeeding type. The packer wheel is driven through the miter gears $d^4$, shaft $d^5$ and sheave $d^6$ by a belt $d^7$, passing over the sheave $b^5$ on the power shaft.

*Temporary spring spacers.*—A word having been assembled in the assemblage channel, the operator depresses the space key of the setter (not shown) which actuates mechanism to insert into the line immediately following the last type of this word, one of the temporary spring spacers E shown in detail in Figs. 18 and 19. This spacer consists of two pieces of spring tempered metal, preferably steel, riveted together at one end and having at their other ends T-shaped heads $E^1$ with a notch $E^2$ cut in the upper edge of each wing of the spacer. The two parts of the spacer are formed so that they would, if unrestrained, open considerably farther than shown in the figure. A rivet $E^3$ secured to one portion and passing loosely through the other portion limits the amount of expansion of the spacer to an amount slightly in excess of the thickness of the thickest permanent space used in the machine. The T-heads of the spacers are in width considerably less than the length of a type, and in height substantially the same as the body of the type with which they are to be used. The upper corners are slightly rounded as shown in Fig. 19.

*Spring spacer inserting mechanism.*—A supply of these spacers is carried by the channeled bar $E^4$ (Figs. 1, 2, 5, 6 and 8) being supported in the T-slot therein by their T-heads as shown in Fig. 6. The spacers are held under partial compression by the latch $E^5$ which is pivoted at $E^6$ in a slot in the top of the bar $E^4$ and drops over the upper end of the left hand spacer. The elasticity of the spacers thus supported tends to feed them toward the right against a bar $e$ secured to the frame $A^1$, and above a pusher $e^1$ carried by a block $e^2$ and guided by the tongue $e^3$ and groove $e^4$ in the bar $e$. This block is operated by the link $e^5$, bell crank lever $e^6$ (Fig. 4) which is pivoted at $e^7$ to the pillow block $A^6$, and carries at the end of its shorter arm a cam roll $e^8$ in engagement with a cam $e^9$ loosely mounted on the continuously revolving shaft $b$. Lugs $e^{10}$ projecting from the hub of this cam engage slots in the hub of a clutch member $e^{11}$ loosely mounted on the shaft and adapted to coöperate with the continuously rotating clutch member $b^6$ cut in the side of the hub of the pinion $b^3$ above referred to. Springs $e^{12}$ seated in the hub of the cam tend to force the clutch member $e^{11}$ into engagement with the member $b^6$. It is held out of such engagement by an inclined face of the block $e^{13}$ (also Fig. 20) secured to the hub of the clutch member $e^{11}$, which engages a pin $e^{14}$ carried in a fixed standard $e^{15}$ secured to the bed plate of the machine. This pin is kept elevated in the path of the beveled block $e^{13}$ by a spring $e^{16}$ and is connected with the space key in the key board by a pin $e^{17}$ working through a slot in the standard and engaging a bell crank lever $e^{18}$ pivoted at $e^{19}$ and connected to a link $e^{20}$ operated upon by the space key in the key board of the setter.

When the space key is depressed, the pin $e^{14}$ is withdrawn from engagement with the beveled block $e^{13}$ permitting the movable clutch member to be pressed into engagement with the member $b^6$, to communicate one complete rotation to the cam $e^9$. Toward the end of this rotation the beveled face of the block $e^{13}$ meets the pin $e^{14}$ (the space key meanwhile having been released) and forces the clutch members apart bringing the cam to rest. The roll $e^8$ on the bell crank lever $e^6$, above referred to, following, under the action of the spring $e^{21}$, the periphery of this cam during its rotation, the lifter $e^1$ is elevated forcing the foremost spring spacer in the channel $E^4$ upward through the opening $E^7$, (Figs. 2 and 5) directly above it, and between the bar $e$ and the guide $E^8$ which engages and guides only the overhanging ears $E^1$ of the spacer. The upper end of the spacer is thereby passed through a slot $D^{12}$ in the lower side of the assemblage channel. This slot is somewhat narrower than the spacer when normally extended. As the T-end of the spacer passes through the slot, the ears of the left hand side of the spacer spring over the sides of the slot to retain the spacer in the assemblage channel.

In order to permit the entrance of the spacer into the assemblage channel between the previously assembled type and the packer wheel, it is necessary to provide mechanism to advance the type away from the packer wheel to form a gap of sufficient width to permit the entrance of the spacer. A plate $e^{22}$ (Figs. 2, 4 and 12) having a slot $e^{23}$ which yokes around the wiper wheel stands normally in a position to the right of the path of the incoming type. This plate is held in this position by a two armed lever $e^{24}$ engaging in a notch $e^{25}$ in the plate $e^{22}$. It is pivoted at $e^{26}$ and drawn to the right by the spring $e^{27}$. The lower arm of this lever is provided with a beveled face $e^{28}$ normally in the path of the upper end of the block $e^2$, in such position that as the block rises to elevate a spacer into the line, this bevel is met by the block thereby pressing forward the plate $e^{22}$ and advancing the type in the assemblage channel to a position to the left of the slot through which the spacers are inserted, the spacer passing between the arms of the plate. As the block $e^2$ descends, the plate is withdrawn out of the path of the succeeding type by the spring $e^{27}$. A line of type is thus assembled with spring spacers between each two words, the line being overset by an amount which shall permit of its compression to the limits of the length of the required line.

*Assemblage member.*—The channel $D^1$ (Figs. 1, 2, 6 and 12) in which the type are assembled is formed between the member D and the plate $D^3$ secured thereto. The width of the channel is substantially equal to the body of the type. A longitudinal slot $D^4$ is formed throughout the length of the member about midway of its width. The lower ends of the spacers as they are inserted into the line hang in this slot and pass through it as the line is advanced toward the left. This slot is widened somewhat in its lower portion to prevent the lower ends of the spacers from dragging against its sides. The lower right hand corner of the member D is cut away, as shown in Fig. 1, to make room for the adjacent parts. The cover plate $D^3$ of this channel has a slot $D^5$ extending nearly its whole length. This slot has extending ribs $D^6$ rising at $D^7$ to a higher level as shown in Fig. 2. The follower $D^2$, above referred to, against which the incoming type are received, consists of a flat plate having an upwardly extending lug $D^8$ with ears overhanging the ribs of the slot $D^6$ heretofore referred to, in such manner that as the follower is advanced to the extreme of its travel toward the left it is elevated by the inclined portion of the ribs of the slot out of the path of the line of type. A pin $D^9$ projects from the forward edge of this follower by means of which the follower is returned to its initial position, as hereinafter described. As the follower is elevated as just described, the pin rises into the notch $D^{10}$. (Fig. 1.)

A line of the proper length having been assembled in the assemblage channel, the operator depresses a key or lever of any suitable form (hereafter referred to as the " linelever ") in connection with the key board of the setting mechanism and not herein shown, the effect of which is to cause the clutch $B^3$ (above referred to) to communicate one complete rotation to the line shaft B. This clutch consists of the notch-disk $B^3$ (Figs. 4 and 11) secured to the gear $B^1$ as above described. It is loosely mounted on the shaft and continuously rotated in the direction of the arrow in Fig. 4. A pawl $B^5$ having formed on one end a hook $B^6$ adapted to engage in any one of the notches of the clutch disk, is pivoted at $B^7$ to the cam $f$ which is secured to the line shaft. A spring $B^8$ tends to press the hooked end of this pawl into engagement with the clutch disk. The pawl is held out of engagement, however by the downwardly extending lug $B^9$ which engages the upwardly extending hooked end of a bell crank lever $B^{10}$. This lever being connected with the line-lever (not shown) by the link $B^{11}$, the actuation of the line-lever by the operator causes the hooked end of the bell crank lever to be lowered, releasing the pawl and permitting it to make a positive engagement between the clutch disk and the cam, causing the line shaft to be rotated. Toward the end of a complete rotation of the shaft, (the line-lever having been released) the clutch pawl $B^5$ is engaged by the hooked end of the bell crank lever, drawing the pawl out of engagement with the clutch disk and causing the shaft to come to rest. This rotation of the line initiates the operations of justification.

The first operation of the line shaft is to elevate the line into the path of an advancing and compacting bar F (Figs. 1, 2, 4, and 12). The assemblage member D is rigidly secured to a gib $D^{10}$ which is guided in a slot $D^{11}$ in the main frame $A^1$ of the machine. Secured to this gib and projecting through an opening in the frame toward the rear of the machine is a standard $d^8$ to which is pivoted the upper end of a link $d^9$ which yokes around the line shaft at its lower end and carries a roll $d^{10}$ acted upon by the cam $d^{11}$. Immediately succeeding the commencement of the rotation of the line shaft, the increasing face $d^{12}$ of this cam meets the roll $d^{11}$ to elevate the assemblage member to bring the line of type into the path of travel of the advancing and compacting bar above referred to. The concentric face of the cam maintains the assemblage member in its elevated position until near the end of the rotation when the assemblage member is permitted to descend to its normal position.
The advancing and compacting bar above referred to consists of a bar F (Figs. 1, 2 and 4) of substantially the cross section of a line of type, but having the upwardly extending rib in which rack teeth $F^1$ are cut.
This bar is guided by a plate $F^2$ secured to the frame of the machine. Through an opening in the upper face of this plate a gear $F^3$ engages the rack teeth of the bar F. This gear is carried on a shaft $F^4$ which has a bearing in a lug $A^2$ projecting from the rear of the frame of the machine, and has on its rear end a pinion $F^5$ in engagement with the rack teeth formed in the upper end of the link $F^6$. A gib $F^7$ retains this rack in engagement with the pinion at its upper end; and at its lower end the link yokes around a groove in the hub of the cam $f$. The link carries a roll $F^8$ in engagement with the cam. As the increasing face $f^1$ of this cam meets the roll immediately succeeding the elevation of the assemblage member, as above described, the link is raised rotating the pinion $F^5$ and the gear $F^3$ to advance the bar F through the assemblage channels, thereby advancing the line of type through, and out of, the assemblage channel and into the adjacent elevator to be hereafter described. Toward the end of the rotation of the shaft the decreasing face $f^2$ of a cam permits the return of the advancing bar, under the action of the spring $F^9$ (Fig. 3) the operation being completed in time to permit the assemblage member to descend as above described.
*Elevator.*—When the assemblage member is elevated the assemblage channel therein is brought into alinement with an opening $G^{19}$ through a piece $G^{20}$ (Figs. 2 and 7) secured to the frame $A^1$, through which the line of type is advanced by the mechanism just described, into a channel G in a member which I term the "elevator". This elevator (see Figs. 1, 2, 8, 16 and 17) is of substantially the same cross section as the assemblage member just described. It is provided with the channel G throughout its length, which channel is formed between the two portions of the elevator $G^1$ and $G^2$, the former being made for convenience of construction in two parts, as indicated in Fig. 8. These two portions are secured to gibs $G^3$ and $G^4$ respectively, both guided in a groove $G^5$ in the main frame. The yoke $G^6$ (Fig. 3) engaging studs $G^7$, which project from the gibs through slots in the main frame $A^1$ toward the rear, maintain the two portions of the elevator at a fixed distance from each other to form the channel G between them. A shoulder $G^8$ (see Fig. 8) forms a guide for the foot end of the type in the elevator, and the channel $G^9$ permits the passage of the spring spacers in the line.

The working length of the elevator is determined by an adjustable end piece $G^{10}$, (Figs. 2, 16 and 17) U-shaped in cross section, adjustably supported by a tongue projecting into a groove $G^{11}$ in the main frame $A^1$ and secured thereto at any point by a screw $G^{12}$ passing through the slot in the lower portion of the adjustable piece. This screw may be set in any one of the screw holes $G^{13}$ to secure greater range of adjustment than is provided by the length of the slot. The upwardly projecting ends of this piece pass through slots $G^{14}$ in the elevator as shown in Figs. 2, 16 and 17, forming a limiting end to the length of the channel in the elevator, so that the length of this channel may be adjusted in accordance with the desired length of line. The upper portion of the elevator is made in two parts, the part $G^2$ which does not exceed in length the narrowest column width which the machine is adapted to justify, and the piece $G^{16}$ adjustable in the T-groove in the part $G^2$. This latter piece may be adjusted with its end in line with the working face of the adjustable end piece $G^{10}$ by means of the set screw $G^{17}$ passing through a slot in the part $G^2$.
In virtue of the width of the spring spacers the line, as assembled, is, before justification, in excess of the required length of line. The assemblage member being elevated, as heretofore described, the advancing and compacting bar F advances the line out of the assemblage member through the opening $G^{19}$ in the piece $G^{20}$ into the channel in the elevator. As the foremost type in the line reaches the end of this channel further advancement of the bar F compacts the line, closing up the gap maintained between words by the spring spacers to whatever extent may be necessary to bring the line to the required length. The compacting bar comes to rest with its left hand end flush with the right hand end of the channel in the elevator. In this position, and while the concentric portion $f^3$ of the cam $f$ (Fig. 4) is passing the roll on the link $F^6$ an increasing face $g^1$ of a cam $g$, secured to the line shaft, meets the roll $g^2$ on the link $g^3$ and lifts this link to raise the elevator, the link being connected with a standard $g^4$ secured to the gib $G^3$ of the elevator. Reaching its highest position the beveled end of a pin $g^5$ seated in the frame of the machine is pressed by a spring $g^6$ into a beveled seat $G^{18}$ in the rear side of the gib of the elevator, serving to retain the elevator in its raised position after the decreasing face $g^7$ of the cam has passed the roll on the link $g^8$. The line is thereby moved into the line carrier which retains and advances the line through the justifying mechanism, as described below.

*Line carrier.*—The line carrier H (Figs. 1, 2, 12, 13, 14 and 15) consists of an L-shaped plate $H^1$, the thickness of which is equal to the body of the type used in the machine. To this is adjustably secured, by means of set screws $H^3$ passing through slots $H^4$, a plate $H^2$ of the same thickness, and offset, as shown in Fig. 15, to aline with the plate $H^1$. This plate $H^2$ may be adjusted along the plate $H^1$ to leave an opening between the ends $H^5$ and $H^6$ of the two plates, equal in length to the length of the required line. Rack teeth $H^7$ are cut in the forward edge of the body portion of the carrier, by means of which the carrier is advanced through the justifying mechanism, as will be hereafter explained. An L-shaped piece $H^8$ adjustably secured on the under side of the carrier by means of a set screw $H^9$ passing through a slot $H^{10}$, and a beveled lug $H^{11}$ on the upper face of a body part of the carrier will be hereafter referred to. The normal position of this carrier in the machine is shown in Figs. 1, 2, 7, 8, 9 and 12. As shown, the carrier stands directly in line with the upper portion of the elevator so that this portion of the elevator passes through the opening in the carrier and moves the line contained in the elevator channel into the carrier between the ends $H^5$ and $H^6$ of the carrier, (as clearly shown in Fig. 12) when the elevator is raised as heretofore described. The carrier now being advanced toward the left, the line will be moved from the channel in the elevator into a channel L (which I term the "justifying channel") (Figs. 1, 2, 9, 10 and 12). This channel is formed between the castings $L^1$ and $L^2$ and the cover $L^3$ secured thereto in such position as to leave a channel of the width of the body of the type through which the carrier with the contained line of type may advance. A T-shaped bar $L^4$ (Figs. 2 and 17) carried in a corresponding slot in the cover plate of the justifying channel is adjustable toward the bar $G^{16}$, being secured by a set screw $L^5$ so that as the elevator is shortened for shorter lines the bar $L^4$ will cover the gap that would thereby be made between the end of the adjustable elevator bar and the end of the cover plate of the justifying channel.

*Line advancing mechanism.*—Reference being had to Figs. 1, 8, 10, 11 and 12, the rack teeth $H^7$ on the forward edge of the body part of the line carrier are in mesh with the teeth of a gear $h$ which is loosely carried on a vertical shaft $h^1$. This gear rests on a collar $h^2$ secured to the shaft. Above the gear is a leather washer $h^3$ and collar $h^4$ pressed into engagement with the gear by means of a spring $h^5$ and jam nuts $h^6$ on the upper end of the shaft, by means of which any required degree of friction may be produced between the gear and the collars. This shaft has a bearing near its upper end in the casting $L^1$ and near its lower end in a pillow block $h^7$. Fixed to the lower end of the shaft is a double bevel gear $h^8$ and $h^9$, the two parts being of different diameters as shown. A horizontal shaft $h^{10}$ is carried in bearings in the pillow blocks $h^{11}$ and $h^{12}$ and is driven by a belt $h^{13}$ passing over the sheave pulley $h^{14}$, and the sheave pulley $h^{15}$ on the power shaft $b$. The shaft $h^{10}$ carries two bevel gears $h^{16}$ and $h^{17}$ secured thereto, and so located that but one of them may be in engagement with one of the bevel gears $h^8$ or $h^9$ at a time. A coil spring $h^{18}$ on the shaft tends to hold the shaft in the position shown in Fig. 1.

In the position of the parts as shown in Fig. 1, the direction of rotation of the shaft $h^{10}$ is such as to tend to move the carrier toward the right. Provision is made for throwing the gear $h^{16}$ out of engagement, and the gear $h^{17}$ into engagement at the proper time, as follows: On the shaft $h^{10}$ are secured two collars $h^{19}$ and $h^{20}$ against the left hand one of which a grooved collar $h^{21}$ is held by a coil spring $h^{22}$ pressing against the right hand collar. This spring is sufficiently stout to move the shaft toward the right against the tension of the spring $h^{18}$, above referred to, when the collar $h^{21}$ is moved toward the right. This collar is engaged by a pin $h^{23}$ secured to a lever $h^{24}$ which passes through the frame $A^1$ of the machine, and is fulcrumed on a block $h^{25}$ secured to the frame. The rear end of this lever carries a pin $h^{26}$ adapted to be acted upon by a cam face $h^{27}$ formed on the inside of a groove in the hub of a cam $P^{10}$ secured to the line shaft. This cam face is so located that just before the conclusion of the rotation of the line shaft, the lever is actuated thereby, to shift the shaft $h^{10}$ toward the right, and move the gear $h^{16}$ out of engagement, and the gear $h^{17}$ into engagement with the gear $h^9$. The coiled spring $h^{22}$ is provided, in order to prevent injury to the teeth of the gears in case they do not drop into exact mesh as the shaft is moved by the lever. The shaft being moved toward the right, a bar $h^{28}$, pivoted on the side of the pillow block $h^{11}$ and guided at its outer end by an overhanging lug $h^{29}$ on the side of the pillow block, drops down across the end of the shaft to prevent the return of the shaft to the left under the action of the spring $h^{18}$.

The position of the parts, as just described, causes the vertical shaft $h^1$ to be rotated in the reverse direction from that caused by the position shown in Fig. 1. The carrier will thereby be advanced toward the left moving the line from the elevator and into and through the justifying channel to bring it under the action of the space selecting and inserting mechanism which will now be described.

*Space selecting and inserting mechanism.*—A graduated series of permanent spaces, each size varying from the next by any desired amount, is provided in a space case M (Figs. 1, 2, 3, 9 and 12). This case stands vertically, may be of any desired height, and consists of a bottom $m$, back $m^1$, front $m^2$, and partitions $m^3$. These partitions are preferably equally spaced from edge to edge, but are of such thickness as to form channels of the proper width to contain spaces of successive sizes placed therein on edge. Any desired number of sizes of spaces, varying by any required unit in thickness may be used. In the machine here shown nine sizes are provided, and a variation of .01 inch between successive sizes has been adopted. This gives ample range of justification. The bottom space of each channel is in line with, and directly behind the justifying channel as clearly shown in Fig. 9.

Through an opening $L^6$ in the cover plate $L^3$ of the justifying channel project a series of feelers N (Figs. 1, 2, 9 and 12) there being a feeler directly in line with each channel of the space case, the lower ends of the feelers being of a slightly less width than the spaces in the channels in line with them. These feelers are of the form shown in Fig. 9. They are pivoted on a rod $N^1$ carried in the bearings $N^2$, and are spaced apart at the proper distances by collars $N^3$ between them. Each feeler is guided by a projecting tongue $N^4$ extending into a corresponding groove in the fixed bar $N^5$ and is pressed upon by one branch of the comb spring $N^6$ secured to the bar $N^7$ carried by bearing blocks $N^2$. Each feeler also has a forwardly extending arm $N^8$ and a downwardly projecting arm $N^9$.

Below and in line with each feeler is a horizontally movable bar $n$. These bars are guided at their forward ends in notches in the bars $n^1$, $n^1$ carried by the bracket $A^3$ secured to the frame $A^1$. They rest at their rearward ends on the bar $n^2$ and are guided between the plates $n^3$. Each of these bars has pivoted to it a trip $n^4$ and a dog $n^5$. The trip $n^4$ has an upwardly extending beveled face $n^6$ which is maintained in the position shown in Fig. 9 by engagement with the lower end of the depending arm $N^9$ of the feeler. The rear end of this trip is provided with a downwardly extending hooked projection $n^7$.

Guided in grooves $n^8$ in the rails $n^9$ secured to the lower edge of a bracket $A^4$ is a sliding plate $n^{10}$ having on its forward edge the upwardly projecting beveled rib $n^{11}$ and on its rear edge the rib $n^{12}$. The former is adapted to engage the projecting hook of the trip $n^4$ at the proper time to move the bar $n$ toward the rear, and the latter is adapted to engage the downwardly projecting lug $n^{13}$ on the bar to return the bar to its normal position. This oscillating plate carries brackets $n^{14}$ to which is pivoted a link $n^{15}$ pivoted to the upper end of a lever $n^{16}$. This lever is pivoted to a standard $n^{17}$ which is secured to the rear side of the frame $A^1$. Pivoted to this lever by a stud $n^{22}$ is a link $n^{18}$ yoked around the power shaft $b$, and carrying a roll $n^{19}$ in engagement with the eccentric $n^{20}$ secured to the shaft. A spring $n^{21}$ secured to the stud $n^{22}$ and to the pillow block $A^7$ causes the roll to follow the periphery of the eccentric thereby communicating a reciprocating motion to the plate $n^{10}$, yieldingly in a rearward direction, positively in the forward direction.

Standing directly behind the lower end of each space channel, guided by the notch bar $N^{10}$ is an ejector $N^{11}$ the forward portion of which is of substantially the same cross section as the permanent space in the channel opposite it. The enlarged rear portion of each of these ejectors is guided beneath the bar $N^{12}$ and between the plates $n^3$, and has on its lower edge rack teeth $N^{13}$ in engagement with the teeth of a gear segment $N^{14}$ loosely fulcrumed on the shaft $N^{15}$. This shaft $N^{15}$, the shaft $N^{18}$, the guide bars $N^{12}$ and $n^2$, as well as the rails $n^9$ are secured to the bracket $A^4$ attached to the rear side of the frame of the machine. Formed on the hub of each of the gear segments $N^{14}$ are the gear teeth $N^{16}$ with which mesh the teeth of the gear segment $N^{17}$ fulcrumed on the shaft $N^{18}$. Each of these gear segments rest, as shown, upon the upper face of one of the bars $n$ in such position as to be lifted against the action of a spring $N^{24}$ by the two upwardly inclined cam faces $n^{23}$ and $n^{25}$ when the bar $n$ moves rearward, thus causing the rotating of the gear segment $N^{14}$ and the advancement of its ejector. This ejector forces a space from the corresponding channel of the space-case into the justifying channel.

Beneath each of the horizontal arms $N^8$ of the feelers, above referred to, is a bar $N^{19}$ guided at its upper end in notches in the bar $L^7$ and at its lower end in notches in the bars $N^{20}$. A lug $N^{21}$ on the forward side of each of these bars limits its downward movement. A forwardly projecting foot of each of the bars has an inclined face $N^{22}$ adapted to be engaged by the upper end of the dog $n^5$ above referred to, as the bar $m$ moves toward the rear. The dog is free to swing around its pivot in one direction only, being stopped in the other direction by the pin $n^{27}$.

The action of the above mechanism is as follows. In the normal position of the parts, before the carrier has commenced to advance, the feelers all rest, each in line with its corresponding space-channel, on the upper face of the carrier plate $H^2$. As the line is advanced toward the left the type passes beneath the feelers, each successive gap between words passing beneath one feeler after another until it reaches a feeler the thickness of which is equal to, or something less than, the gap between the words. The gap passing beneath such a feeler, the spring $N^6$ causes the feeler to snap into the gap, the notch $E^2$ above referred to being provided in the upper end of the spacers to permit the feeler to drop into the gap. This entrance of the feeler into the gap causes the line to come to rest, the collars $h^2$ and $h^3$ slipping on the gear $h$ in virtue of the frictional engagement between the collars and the gear. As the feeler drops into the gap the downwardly projecting arm of the feeler swings forward releasing the forward end of the trip $n^4$ and permitting the rear end of this trip to drop into position to be engaged by the upwardly projecting rib $n^{11}$ of the continuously oscillating plate $n^{10}$ on its next rearward movement. The bar $n$ is thereby carried toward the rear, producing in its rearward movement the following sequence of operations; First, the dog $n^5$ is caused to engage the beveled foot of the bar $N^{19}$ lifting this bar against the horizontal arm $N^8$ of the feeler, thereby causing the end of the feeler to pass through the gap in the type line to eject the spacer from the line, the groove $L^8$ in which the spacers hang being widened in its upper part at $L^9$ as shown in Figs. 2, 9 and 10, to a width equal to the width of the upper end of the spacer. The spacer thus ejected from the line hangs by its ears upon the shoulders of this groove. The sides of the feelers being slightly tapered as shown in Fig. 2, this downward movement of the feeler slightly widens the gap between the words to permit of the free entrance of a permanent space. This taper is very slight, and in the case of the last space in the line the compressibility of the line itself will take care of it.

The action just described takes place while the bar $n$ is moving rearward a distance about sufficient to bring the lower end of the cam face $n^{23}$ beneath the corner of the gear segment $N^{17}$. Following this action this cam face causes the gear segment to be elevated thereby advancing the ejector sufficiently to push a permanent space partially into the line gap, but not far enough to cause the space to strike the feeler. While the horizontal face $n^{24}$ is passing beneath the gear segment, the dog $n^5$ comes into engagement with the lower end of the downwardly depending arm $N^9$ of the feeler which now stands in the position shown in dotted lines in Fig. 9. At the same moment the side of the dog strikes the corner of the bar $n^{23}$. This bar is supported on the bracket $A^3$, and is notched so as to project upward between the bars $n$, as indicated in Fig. 9. This causes the dog to be swung around on its pivot as its upper end strikes the lower end of the arm $N^9$, thereby throwing this arm to the rear to lift the feeler out of the gap between the type. The rotation of the dog on its pivot occasioned by its engagement with the bar $n^{28}$ causes the upper end of the dog to swing downward to disengage itself from the arm of the feeler after moving it far enough to withdraw the feeler from the line gap. This action will take place while the horizontal face $n^{24}$ is passing beneath the gear segment $N^{17}$. Following this action the cam face $n^{28}$ will further lift the gear segment, advancing the ejector sufficiently to drive the space all the way into the line. As the reciprocating plate $n^{10}$ returns the bar $n$ will be returned to its normal position, by the engagement of the rib $n^{12}$ of the plate with the downwardly projecting lug $n^{13}$ of the bar. The feeler having assumed its normal position upon the line of type, the beveled face $n^6$ of the trip $n^4$ will meet the lower end of the arm $N^9$ tipping the trip back to its normal position and out of further engagement with the reciprocating plate.

After the feeler is lifted out of the gap between the type, the partially introduced space prevents the further advancement of the line until that space shall have been driven home in the line, whereupon the line carrier is free to advance under the action of the gear $h$ until again stopped by a feeler engaging another line gap when the same succession of operations will take place. Spacers, as they are ejected from the line, remain supported by their ears engaging the bottom of the enlarged portion of the channel $L^8$. Spacers still remaining in the line will advance these ejected spacers toward the left as far as may be necessary as the line travels under the feelers.

In the forward movement of the line as the right hand end of the line of type passes from beneath the feelers, the right hand end portion $H^{12}$ of the carrier passes under the feelers maintaining them in their normal position. This is necessary to prevent the dropping of the feelers after the line has passed under them, and the consequent operation of the bar $n$.

As the carrier reaches the end of the required travel toward the left the beveled end of the lug $H^{11}$ on the upper side of the carrier passes beneath the hooked end $h^{30}$ of the rod $h^{31}$ (Figs. 1 and 10) raising it. This rod has a bearing in the casting $L^1$ and is pivoted at its lower end to the bar $h^{28}$ heretofore referred to as having dropped down across the end of the shaft $h^{10}$ to retain it in a position to cause the forward advancement of the line. This bar is thereby raised out of engagement with the end of the shaft, permitting the shaft to move to the left under the action of the spring $h^{18}$ to move the gear $h^{17}$ out of engagement with the gear $h^9$, and to bring the larger gear $h^{16}$ into engagement with the gear $h^8$, thus causing the direction of rotation of the vertical shaft $h^1$ and gear $h$ to be reversed, thereby returning the carrier to its normal position, the line of type passing this time idly beneath the feelers. The relative proportions of the gears causes the carrier to be returned more rapidly than it was advanced, for the purpose of economizing time.

The elevator G still stands in its raised position, being there maintained by the spring detent $g^5$ heretofore described. As the carrier reaches the end of its movement toward the right the shoulder $H^{13}$ comes into engagement with a pin $t$ projecting from a bell crank lever $t^1$ fulcrumed on the rear side of the main frame at $t^2$ (Figs. 3 and 12). The position of this bell crank lever at the time of engagement by the carrier is shown in dotted lines in Fig. 3, its horizontal arm $t^3$ being hooked into a notch $t^4$ in the vertical rod $t^5$. As the carrier strikes the pin $t$, the pin is thereby moved to the right swinging the horizontal arm upward to lift the rod, the beveled upper end of which coming against the pin $t^6$, the rod is forced to the left, out of engagement with the bell crank arm. This movement to the left is permitted by the width of the slot in the guide bar $t^7$ through which the rod passes, the rod being held in its normal position by a flat spring $t^8$. After swinging this bell crank lever as far as permitted by the slot $t^9$ the carrier is thereupon brought to rest, the frictional connection between the shaft $h^1$ and the gear $h$ permitting its stoppage. The rod just referred to is connected at its lower end to a lever arm $t^{10}$ (Figs. 3, 6, 10 and 11) secured to the end of a shaft $t^{11}$ carried in brackets $t^{12}$ secured to the rear side of the frame $A^1$. This shaft carries at its left hand end an arm $t^{13}$ the upwardly projecting end of which stands in the path of the downwardly projecting end of a clutch pawl $t^{14}$ which is similar in all respects to the clutch pawl $B^5$ heretofore described. This clutch pawl is pivoted to the side of the cam $p$ loosely journaled on the line shaft B, and is adapted when released by the depression of the arm $t^{13}$ as just described, to engage one of the notches of the clutch disk $B^4$ secured to the gear $B^2$ loosely mounted on this same shaft and continuously rotated by the pinion $b^4$ on the power shaft $b$ of the machine. The arm $t^3$ being disengaged from the notch $t^4$ (as above described) as soon as it has lifted the rod sufficiently to permit the operation of the clutch, the arm $t^{13}$ is at once swung upward, by a coil spring $t^{15}$ on the shaft $t^{11}$, to intercept the clutch pawl at the end of a single rotation and bring the cam $p$ to rest.

This cam controls, through the roll $p^1$, the movements of a link $p^2$ yoked around the hub of the cam at its lower end and connected at its upper end to a lever arm $p^3$ secured to the shaft $p^4$. This shaft is journaled in the pillow block $p^5$, which is secured to the frame $A^1$; and it carries at its right hand end a lever arm $p^6$ loosely mounted thereon, and a two armed lever $p^7$ secured to the shaft (see also Fig. 8). The arm $p^6$ is drawn downward by a coil spring $p^8$ hooked to the arm and to a stud $p^9$. A set screw $p^{10}$ projecting through a lug on this lever arm bears on the arm $p^{11}$ of the two armed lever, the arm $p^6$ being normally maintained as shown in Fig. 8 by this connection.

The upwardly extended arm $p^7$ is adapted to advance a plate $p^{12}$ carried by gibs $p^{13}$ secured to the lower face of a bracket $p^{14}$ fastened to the rear of the frame $A^1$. This plate passes through a slot in the frame in line with the elevator channel when in its lower position and when advanced causes the ejection of type from the elevator into the galley placed in front of the elevator. The operation of these parts is as follows: The carrier after having passed the type through the justifying mechanism is returned to its initial position as above described, coming to rest with the line of type in the channel of the elevator; at the same time throwing the clutch mechanism of the cam as just described. As the decreasing face $p^{15}$ of this cam passes the roll $p^1$ on the link $p^2$, springs $p^8$ and $p^{17}$ act to draw the arm $p^6$ downward and the arm $p^7$ forward. The set screw $p^{18}$ on the arm $p^6$ engages a lug $g^8$, projecting from the side of the standard $g^4$ secured to the gib of the elevator, depressing the elevator thereby to its lowermost position. While the elevator is being lowered the upwardly extending arm $p^7$ swings idly between the lugs $p^{19}$ and $p^{20}$ on the ejector plate $p^{12}$ above referred to. After the elevator has reached its lowest position the arm $p^7$ in its further movement engages the lug $p^{20}$ to force forward the ejector, thereby advancing the line of type which is now directly in front of the ejector out of the elevator and into the galley P. The increasing face of the cam $p$ passing the roll $p^1$ the arm $p^7$ is swung backward to withdraw the ejector plate by means of the lug $p^{19}$ and to raise the arm $p^6$ as the arm $p^{11}$ engages the set screw $p^{10}$.

*Galley.*—The galley consists of a flat plate $P^1$ (Figs. 1, 8, 10 and 11) having ears $P^2$ at its lower end which have a bearing on the shaft $P^3$ carried by the pillow blocks $P^4$. Between these pillow blocks and integral with the shaft is a partial gear $P^5$ having engagement with rack teeth on a slide $P^6$ guided in grooves in the pillow blocks. A link $P^7$ connected at $P^8$ to this slide passes through an opening in the main frame of the machine, yokes around the line shaft B and has a roll $P^9$ acted upon by a cam $P^{10}$ on the line shaft. A spring $P^{11}$ secured to slide and the main frame tends to keep the roll in engagement with the cam. A bar $P^{12}$ passing across the upper end of the galley is supported by rods $P^{13}$ on each side of the galley, guided in the blocks $P^{14}$ near their upper ends and engaging at their lower ends pins $P^{15}$ placed eccentrically in the ends of the shaft $P^3$. At the commencement of the operation of the machine, a printer's galley $P^{19}$ having been placed in position in alinement with the fixed ends $P^{16}$ of the machine galley, a follower block $P^{17}$ is placed at the upper end of the galley to receive the first line of type. This follower block is retained in the galley by friction produced by a spring pressed plunger $P^{18}$, the friction being sufficient to sustain the weight of the type deposited in the galley. The type is ejected from the elevator as above described onto the follower block and rests there until the line shaft is operated for the succeeding line, whereupon the cam $P^{10}$ acting through the link $P^7$ advances the slide $P^6$ to rotate the shaft $P^3$ thereby drawing down the rods $P^{13}$ and the bar $P^{12}$, depressing the line of type into the galley to make room for the succeeding line, the bar $P^{12}$ passing down through notches $P^{20}$ in the upper ends of the sides of the fixed portion of the galley.

The galley frame is hinged on the shaft $P^3$ as above described and rests normally against lugs projecting from the spacer channel $E^4$ as shown in Fig. 8. The whole galley frame may thus be swung forward to give access to mechanisms directly behind it without disconnecting any parts.

The spacers ejected from the line remain suspended by their ears in the groove $L^8$ beneath the justifying channel until restored to their storage channel $E^4$ as follows: As the carrier is returned to its initial position after the justification of the line, the L-shaped bar $H^8$ secured to the under side of the carrier and projecting into the groove $L^8$ engages the spacers and advances them to the right to the top of the inclined portion of the groove $E^9$ as shown in Fig. 2, down which they slide under the action of gravity and come to rest at or near the bottom of this incline. They remain in this position until the line shaft is operated for the succeeding line when an increasing face $R^1$ of a crown cam R (made integral with the cam $d^{11}$ before referred to) engages a roll $R^2$ on a lever arm $R^3$ secured to a shaft $R^4$ which shaft carries on its forward end two lever arms $R^5$ and $d^{13}$. The upper end of the lever arm $R^5$ engages a pin $R^6$ in an upwardly extending arm $R^7$ of a lever arm $R^8$. This lever arm is fulcrumed at $R^9$ to a block $R^{10}$ slidable in a groove $R^{11}$ in the main frame. A coiled spring $R^{12}$ tends to hold this block in the position shown. The lever arm $R^8$ at its left hand end is bent forward and upward as shown in Figs. 2 and 8. The upwardly extending portion $R^{14}$ of this lever alines with the opening in the bottom of the spring spacer channel $E^4$. The cam R above referred to, causes the lever $R^5$ to swing toward the right. The upper end of this lever engaging the pin $R^6$, first causes the left hand end of the lever to be lifted coming up behind the spacers at the bottom of the inclined channel $E^9$, and then causes the lever to be advanced bodily to the right, engaging the spacers and passing them beneath the pawl $E^5$ which drops into a notch $R^{13}$ in the upper end of the lever arm $R^8$, retaining the spacers when the lever arm returns under the action of the spring $R^{12}$. At the same time the lever arm $d^{13}$ engages the pin $D^9$ projecting from the assemblage channel follower, to return the follower to its initial position at the right hand end of the assemblage channel.

I claim:

1. In a justifying machine, the combination of compressible spacers, means for assembling a line of type with such spacers interspersed, means for compressing such line, and means for substituting permanent spaces for the compressible spacers.

2. In a justifying machine, the combination of compressible spacers in the form of V-shaped springs, means for assembling a line of type with such spacers interspersed, means for compressing such line to a predetermined length, and means for substituting permanent spaces for the compressible spaces.

3. In a justifying mechanism, temporary spacers in the form of compressible springs, means for compressing a line having the elastic ends of such spacers in its word spaces, and means for substituting permanent spaces for the spacers.

4. In a justifying mechanism, temporary spacers in the form of a V-shaped compressible spring, means for compressing a line containing such spacers, and means for substituting permanent spaces for the spacers.

5. In a justifying mechanism, temporary spacers, each consisting of a spring and means for continuously maintaining it partially compressed.

6. In a justifying mechanism, a compressible temporary spacer consisting of a V-shaped spring having a notch in its larger end.

7. In a justifying mechanism, a temporary spacer consisting of a V-shaped spring and a member engaging both leaves thereof and holding the same under tension.

8. In a justifying mechanism, a temporary spacer consisting of a V-shaped spring continuously held under tension by a part carried by one leaf and extending loosely through the other.

9. In a justifying mechanism, the combination with a line channel of spring spacers having ears, means for inserting them into the bottom of the line channel and allowing their ears to spring over a longitudinal rail whereby they are held in place.

10. In a justifying mechanism, the combination with a line channel of temporary spaces in the form of V-shaped springs, means for inserting the large end of the springs into the line, said insertion being through a contracted opening beyond which the spring separates holding itself in place.

11. The combination of means for assembling a line of type with interspersed temporary spacers, the temporary spacers being depending springs hanging with their elastic ends in the line, means for compressing such line, and means for thereafter substituting permanent spaces for the spacers.

12. The combination of a number of temporary spring spacers supported in alinement and compressed against a suitable stop, and mechanism for removing the foremost spacer, and allowing the next to automatically take its place.

13. The combination of a channel for holding a line of type, another channel directly under the same for holding temporary spring spacers, means for feeding the spacers toward the forward end of their channel, means for vertically elevating the spacer at the forward end directly into the type channel, means for advancing the type with the interspersed spacers, and means for depressing the spacers directly into their channel and returning them to their channel.

14. The combination of a channel for holding a line of type, another channel beneath the same for holding temporary spring spacers, the elasticity of the spacers feeding them toward the forward end of their channel, means for elevating the spacer at the forward end into the type channel, means for advancing the type with the interspersed spacers, and means for returning the spacers to their channel.

15. The combination of circulating compressible spring spacers, means for assembling a line with the same interspersed, means for compacting the line, means for substituting permanent spaces for the spacers, means for delivering the line, and means for returning the spacers.

16. The combination of circulating compressible spring spacers, means for assembling a line with the same interspersed, means for compacting the line, means for substituting permanent spaces for the spacers, means for collecting the replaced spacers, and means operating once for each line for returning them.

17. In a justifying mechanism, the combination of elastic spacers, means for holding at a definite length a line of type with such spacers interspersed, and means for substituting permanent spacers for the compressible spacers.

18. The combination of a series of elastic spacers, means for holding a line of type with the same interspersed, and means for substituting permanent spaces for the said spacers, the elasticity of the latter automatically readjusting the line whenever the substituted spaces do not accurately correspond.

19. The combination of a series of elastic spacers, means for holding a line of type with the same interspersed, means for compacting the line to a predetermined length, and means for substituting permanent spaces for the said spacers, the elasticity of the latter automatically readjusting the line whenever the substituted spaces do not accurately correspond.

20. In a justifying mechanism, in combination, means for holding a line of type, means for successively and individually testing the width of each space between words, and means for supplying permanent spaces selected accordingly.

21. In a justifying mechanism, in combination, means for advancing a line of type and temporary spacers, means for successively testing the width of each opening between words irrespective of the other openings, and means for supplying permanent spaces for the openings.

22. In a justifying mechanism, the combination of means for successively testing the width of spaces between words by a series of gages, and means for inserting permanent spaces corresponding to the gages which fit the word spaces, and means for maintaining the separation between words.

23. In a justifying mechanism, the combination of means for holding a line of type with interspersed temporary spring spacers between words, means for successively testing the width of the spaces between words, and means for inserting permanent spaces selected accordingly, the elasticity of the spacers readjusting the line if necessary.

24. In a justifying mechanism, the combination with means for holding a line of type of a series of feelers having faces of varying size and adapted to determine the proper size of the permanent spaces, and means for inserting such spaces in the line.

25. In a justifying mechanism, the combination with means for holding a line of type of a series of feelers having faces of varying size and adapted to enter spaces in the line between words and determine the size of permanent spaces to be in the line.

26. In a justifying mechanism, the combination of a series of feelers of varying width, means for successively applying them to each space in the line, and means for inserting permanent spaces corresponding to the feelers engaged.

27. In a justifying mechanism, the combination of temporary spacers each having a notch in it, a series of feelers, means for successively applying them to the notch of each temporary space in the line, and means for inserting permanent spaces corresponding to the feelers engaged.

28. In a justifying mechanism, the combination of a series of feelers having faces successively varying in size, means for feeding a line along said feelers whereby a feeler may move into a space in the line corresponding thereto, and means for inserting in the line permanent spaces corresponding to the feelers engaged.

29. In a justifying mechanism, the combination of a series of feelers having faces successively varying in size, means for feeding a line of type with openings at its word spaces along said feelers in the direction from the largest to the smallest face thereof, whereby a feeler may move into a space in the line corresponding thereto, and means for inserting in the line permanent spaces corresponding to the feelers engaged.

30. In a justifying mechanism, the combination of a series of feelers corresponding, respectively, to the thickness of a series of permanent spaces, means for applying the same to a line of type to determine the proper size of the permanent spaces, and means for inserting such spaces in the line, the operation of said means being initiated by the movement of the feelers.

31. In a justifying mechanism, a series of feelers having faces of varying size and adapted to enter corresponding spaces in the line between words, and means actuated by such movement of the feelers for inserting in the line permanent spaces.

32. In a justifying mechanism, in combination, temporary spacers, a series of feelers having noses of varying widths, means for moving the line of type with interspersed temporary spacers relative to the feelers until a feeler springs into a word space of corresponding width, and means whereby such feeler causes the substitution of a corresponding sized permanent space for the temporary space engaged.

33. In a justifying mechanism, the combination of a series of feelers having faces of successively diminishing width, permanent spaces corresponding to the feelers, means for successively presenting the word spaces of a line to the feelers in the direction from the largest to the smallest feeler whereby one of the feelers moves into the gap between words, and means controlled by such movement for initiating the insertion of a permanent space corresponding to the feeler.

34. In a justifying mechanism, the combination of a series of feelers having faces of successively diminishing width, permanent spaces corresponding to the feelers, notched temporary spacers occupying the word spaces of a line, means for successively presenting such notches to the feelers in the direction from the largest to the smallest feeler whereby one of the feelers moves into the notch, and means controlled by such movement for initiating the insertion of a permanent space corresponding to the feeler.

35. In a justifying mechanism, the combination of a series of feelers corresponding, respectively, to the thickness of a series of permanent spaces, means for applying the same successively to word spaces occupied by temporary spacers, and means controlled by any feeler for ejecting the temporary space and inserting the permanent space in the line.

36. In a justifying mechanism, the combination of a series of feelers having faces of different sizes, means for applying the same successively to word spaces occupied by temporary spacers, means for moving into the line a feeler which fits thereby ejecting the temporary space, and means for inserting the permanent space in the line.

37. In a justifying mechanism, the combination of a series of feelers having faces of different sizes, means for applying the same successively to word spaces occupied by temporary spacers of a line, means for moving into the line a feeler which fits thereby ejecting the temporary space, means for partially inserting a permanent space into the line, means for then removing the feeler from the line, and means for then completing the insertion of the permanent space.

38. In a justifying mechanism, in combination, compressible spring spacers, means for compressing a line containing such spacers, and means for substituting permanent spaces for the spacers, said means including a series of feelers having faces of different size which are successively applied to the line until the proper sized feeler moves into a space between words.

39. In a justifying mechanism, the combination, with compressible temporary spaces, of means for compressing the line containing the same to the required length, a series of feelers having faces of different size, means for presenting the word spaces in the line to the feelers whereby a proper sized feeler may move into a space, and means whereby such movement initiates the insertion of the corresponding permanent space into the line.

40. In a justifying mechanism, the combination, with compressible temporary spaces, of means for compressing the line containing the same to the required length, a series of feelers having faces of different sizes, a series of permanent spaces corresponding to the feelers, means for moving the compacted line relative to the feelers whereby a proper sized feeler may move into a space between words, and means whereby such movement initiates the insertion of the corresponding permanent space into the line.

41. In a justifying mechanism, permanent spacers in the form of V-shaped compressible springs, means for assembling a line of type with such spacers depending between words, means for compressing such line, and means for substituting permanent spacers for the spacers, said means including a series of feelers having faces of different sizes which are successively applied to the line until the proper sized feeler moves into a space between words.

42. In a justifying mechanism, temporary spring spacers having notches therein, a series of feelers having faces of varying widths, means for moving the line with interspersed spacers relative to the feelers until a feeler springs into a space between type of corresponding width, and means whereby such feeler causes the substitution of a corresponding sized permanent space for the temporary space engaged, the elasticity of the remaining spacers thereafter readjusting the line if necessary.

43. The combination of means for assembling type and thereby advancing it, means for inserting temporary spacers, and means for giving the type an additional advancement just preceding the insertion of the temporary space to make room therefor.

44. The combination of means for assembling type including a wiper wheel for advancing all of the preceding type in the line as each type is added, means for inserting temporary spaces, and means yoking around the wiper wheel for automatically giving the assembled type an additional advancement just preceding the insertion of the temporary space to make room therefor.

45. The combination of an assemblage mechanism, a justifying mechanism, a galley between said mechanisms, and a common reciprocating transfer member adapted to transfer the assembled line beyond the galley to the justifying mechanism and the justified line back to the galley.

46. In a justifying mechanism, the combination of means for assembling a line of type with interspersed spring compressible temporary spaces, means for compacting the line to a predetermined length, a transfer member for transferring the line to a justifying device, means for there replacing the temporary spacers by permanent spaces, means for then returning the line to the transfer member and thereby transferring it to a galley.

47. In a justifying mechanism, the combination of an elevator, means for delivering to it a line of type and temporary spaces, means for raising the elevator to bring the line into alinement with a justifying channel, means for feeding the line into the justifying channel and therein justifying it, means for returning the justified line to the elevator, and means for depressing the elevator to bring the justified line into alinement with the galley.

48. In a justifying mechanism, the combination of a galley hinged at its lower end on a horizontal pivot, and mechanism acting concentrically with the pivot for delivering a justifying line into the galley.

49. In a justifying mechanism, the combination of compressible spacers, means for compressing the same in a line, and means for substituting permanent spaces for the compressible spacers.

50. In a justifying mechanism, means for holding a line of type with interspersed compressible spacers, means for compressing such line, and means for substituting permanent spaces for the compressible spacers.

51. In a justifying mechanism, means for compressing to a standard length a line of type with interspersed compressible spacers, and means for substituting for such spacers permanent spaces each of substantially the width of a word space in the compressed line.

52. In a justifying mechanism, means for compressing to a standard length a line of type with interspersed compressible spacers, means for measuring the width of word spaces in such compacted line, and means for supplying permanent spaces substantially the size indicated by such measurement.

53. In a justifying mechanism, means for compressing to a standard length a line of type with interspersed compressible spacers, means entering the word spaces and thereby measuring the widths of the same, and means for supplying permanent spaces substantially the size indicated by such measurement.

54. In a justifying mechanism, means for holding a line at standard length and means for testing individually the width of each word space of the line, combined with means for supplying to such word spaces permanent spaces indicated by the test.

55. In a justifying mechanism, means for testing the width of word spaces of a line held at standard length by successively applying to each space a series of gages combined with means for supplying to such word spaces permanent spaces indicated by the test.

56. In a justifying mechanism, means occupying word spaces for maintaining a line of type at standard length combined with other means for testing the width of such word spaces.

57. In a justifying mechanism, means occupying word spaces for maintaining a line of type at standard length combined with other means for testing the width of such word spaces, and means actuated by the testing means for inserting proper sized permanent spaces.

58. In a justifying mechanism, the combination with temporary spaces, of a feeler and mechanism for causing the same to perform the double function of entering a line gap to select a permanent space and move in such gap to eject the temporary space.

59. In a justifying mechanism, a single feeler and mechanism for causing the same to enter a line gap to select the permanent space and move in the gap to expand the same.

60. In a justifying mechanism, the combination with a line of type of a feeling mechanism having a series of faces of varying size normally outside the line but adapted to enter the line to determine the size of space to be therein.

61. In a justifying mechanism, means for maintaining a line at a definite length, means for maintaining gaps between the words, and means for selecting permanent spaces, said means acting independently for each gap without reference to the width of other gaps.

62. In a justifying mechanism, an assemblage channel, a line carrier, a transfer mechanism capable of being alined with the assemblage channel and with the line carrier.

63. In a justifying mechanism, an assemblage channel for assembling type and elastic spaces therein, a transfer mechanism, means for advancing the line into the transfer mechanism and compacting it, a line carrier, and means for transferring the line into the carrier.

64. In a justifying mechanism, an assemblage channel, a line carrier, a transfer mechanism between the assemblage channel and the carrier, means for advancing the line from the assembling channel to the transfer mechanism, and means for transferring the line to the carrier.

65. In a justifying machine, an assemblage member having a slot therethrough, means for assembling a line of type in said assemblage member with temporary spaces extending into the slot thereof, a line carrier adapted to limit the length of a line, and means for transferring the line of type from the assemblage member to the line carrier.

66. In a justifying machine, means for assembling a line of type with temporary spaces projecting therefrom, an assemblage member in which such line may be assembled having a slot through which the projecting temporary spaces may pass, a carrier, means for transferring the line to the carrier, and justifying mechanism adapted to substitute permanent spaces for the temporary spaces.

67. In a justifying machine, means for assembling a line of type with temporary spaces projecting therefrom, an assemblage member in which such line may be assembled having a slot through which the projecting temporary spaces may pass, a carrier, means for advancing the carrier along a path, said path having a slot to permit the passage of the temporary spaces, means for transferring the line to the carrier, and mechanism adapted to substitute permanent spaces for the temporary spaces.

68. In a justifying mechanism, the combination with notched temporary spaces, of a double-functioned feeler which enters the notch to test the width of the space between adjacent type, and moves therein to eject the temporary spaces.

69. In a justifying mechanism, a feeler having inclined sides, mechanism for causing the same to measure a line gap to select the permanent space, and mechanism for causing the feeler to move in such gap to expand the same.

70. In a justifying mechanism, the combination with notched temporary compressible spaces of a series of testing feelers of different widths adapted to enter said notch and test the width of the space between the adjacent type.

71. In a justifying mechanism, the combination with notched temporary, compressible spaces of means for maintaining a line at standard length, feeling mechanism adapted to enter the notch to determine the size of permanent space, and means for inserting such permanent space.

72. In justifying mechanism, the combination of a V-shaped spring spacer having a notch in its divergent ends and mechanism adapted to enter such notch to measure the width thereof and thereby determine the size of permanent space.

73. In a justifying mechanism, a feeler mechanism for causing the same to measure the line gap and mechanism for inserting the permanent space corresponding to the line gap.

74. In a justifying mechanism, the combination with the compressible spacer adapted to occupy a line gap, of mechanism for measuring the gap when so occupied, and mechanism for replacing the compressed spacer by a permanent space.

75. In a justifying mechanism, in combination, a wedge-shaped feeler adapted to measure the line gap to select the permanent space, and mechanism for causing such feeler to move in the gap to expand the same.

In testimony whereof, I hereunto affix my signature in the presence of two witnesses.

FRANCIS B. CONVERSE, Jr.

Witnesses:
ALBERT H. BATES,
B. W. BROCKETT.